W. S. WALTZ.
AUTOMATICALLY CONTROLLED HEADLIGHT FOR CARS.
APPLICATION FILED JULY 18, 1910.

986,106.

Patented Mar. 7, 1911.

2 SHEETS—SHEET 1.

ATTEST
E. M. Fisher
J. C. Musson

INVENTOR.
WINFIELD S. WALTZ
By Fisher + Mott ATTYS.

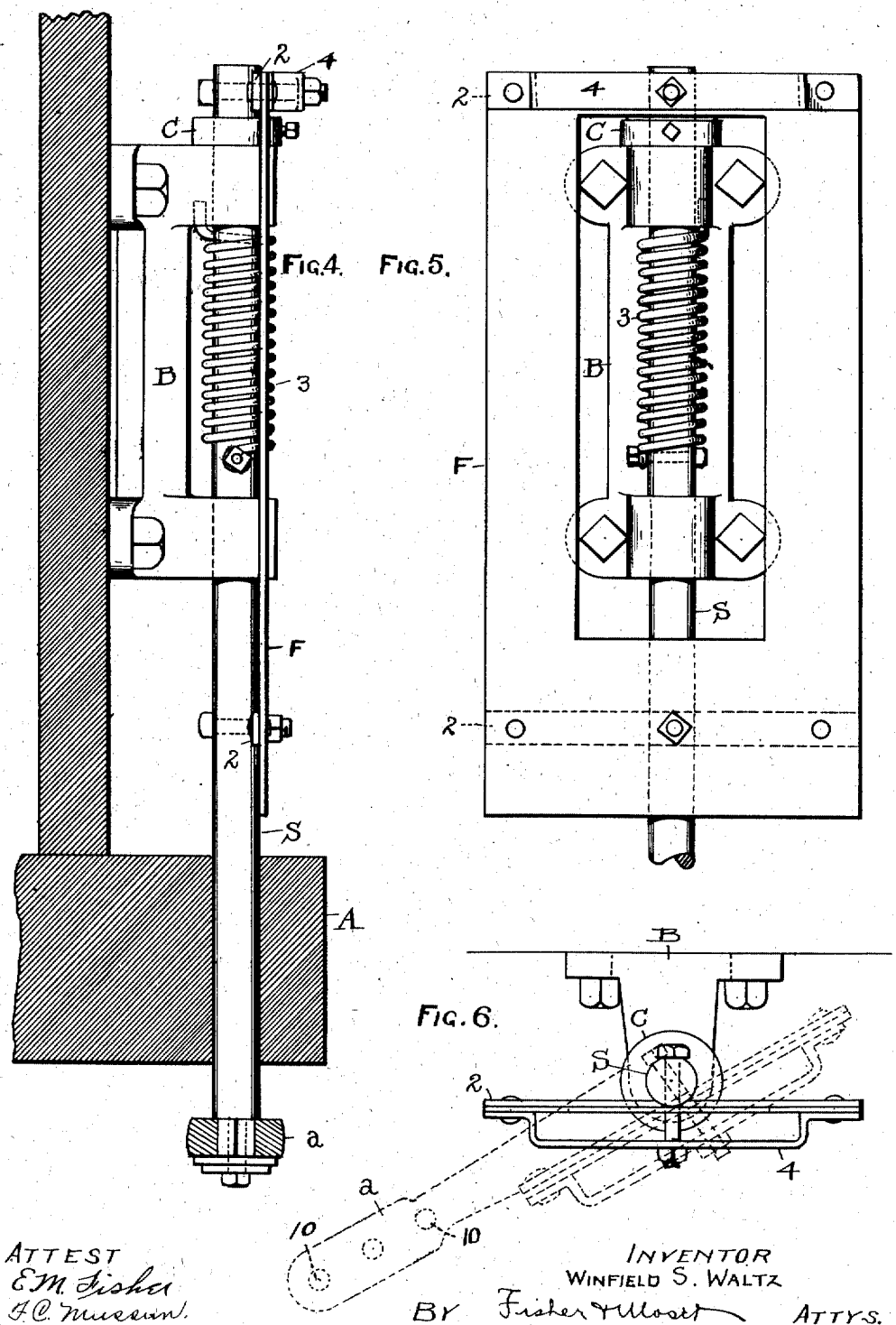

UNITED STATES PATENT OFFICE.

WINFIELD S. WALTZ, OF MEDINA, OHIO.

AUTOMATICALLY-CONTROLLED HEADLIGHT FOR CARS.

986,106. Specification of Letters Patent. Patented Mar. 7, 1911.

Application filed July 18, 1910. Serial No. 572,434.

*To all whom it may concern:*

Be it known that I, WINFIELD S. WALTZ, citizen of the United States, residing at Medina, in the county of Medina and State of Ohio, have invented certain new and useful Improvements in Automatically-Controlled Headlights for Cars, of which the following is a specification.

My invention relates to improvements in automatically controlled headlights for cars, and is adapted to be used on all individually propelled cars whether for city or interurban service, and is an improvement upon the headlight patented to me on the 30th day of March, 1909, No. 916,639.

Figure 1:
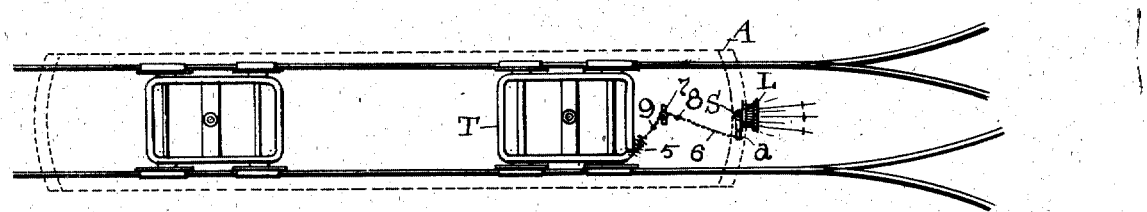
Figure 2:
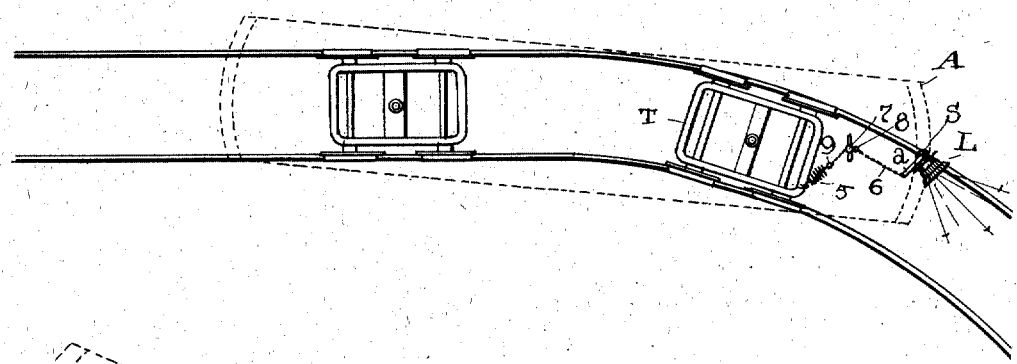
Figure 3:
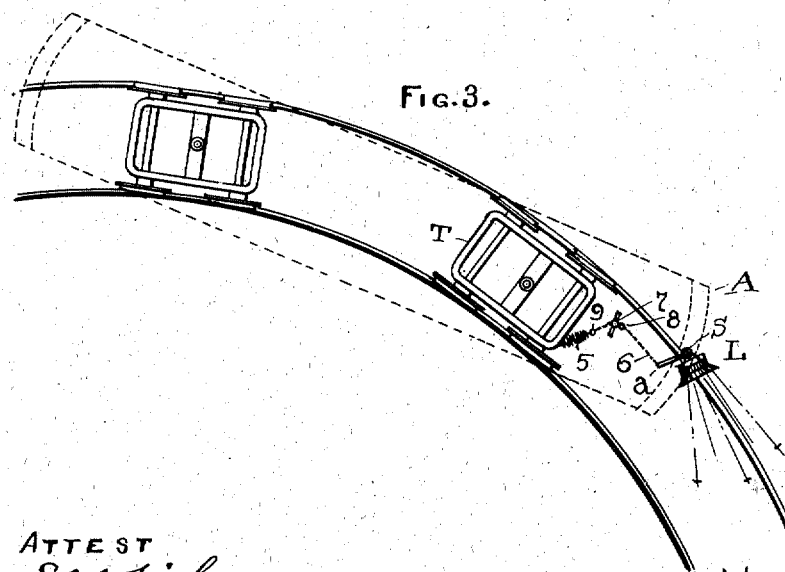

In the accompanying drawings, Figures 1, 2 and 3 are somewhat diagrammatic views of the invention on a considerably reduced scale showing a track and a pair of trucks and the outline of a car body thereon and my improved headlight mechanism connected therewith. In Fig. 2 the car is shown as starting to round a curve, and in Fig. 3 the car is on the full curve, thus showing the relatively different angles the body of the car assumes to the trucks in passing from a straight track to a curve and while rounding the same. Fig. 4 is an enlarged side elevation of the immediate supports for the light mounted on a portion of the car body, and Fig. 5 is a front view of said supports. Fig. 6 is a plan view of Fig. 5.

In the patent above mentioned I show an automatically controlled headlight supported upon the front of a car body and operated from the truck, and in this particular alone there is no material difference in improvement herein, but in the said patent there is but a single spring in the light controlling mechanism, whereas in the present case there are two springs and other novel features. I have found that a single spring in a mechanism of this kind is not sufficient to hold a lamp steady as against all the incidental movements or motions that come to it and which are calculated to cause it to waver and vibrate and to be otherwise disturbed. Of course there is more or less constant relative movement between the car body and the truck in travel and generally owing to unevenness in the track and to other conditions which are liable to work out in a swinging or lurching movement of the body of the car. Now, any lamp supporting mechanism which will impart these unfavorable conditions to the lamp is deemed to be exceedingly faulty and should be remedied. Rather it is important that a lamp should hold a steady position and shed an even light on the track, and hence not participate in the movements of the car more than is unavoidable. Of course being located upon the car body it will necessarily partake more or less of the movements thereof, but such movements in themselves are not liable to be the chief disturbing cause of a steady light. The real trouble occurs when the play of the car becomes magnified in the lamp, and this trouble arises especially in faulty lamp supports.

The present invention, therefore, has in view the steadiness of the lamp under all operating conditions as well as simplicity in construction and certainty in the operation. To these ends I mount a lamp L upon a vertically disposed rod or shaft S, and the said shaft is mounted upon the immediate front of the car body A, Fig. 4, by means of a bracket B. A front border frame F made up out of a suitably stiff piece of sheet metal is affixed to the shaft S top and bottom by means of cross bars 2 which are bolted to said shaft above and below its bearings in said bracket and a collar C fixed on the shaft rests upon the bracket and holds the said shaft in position vertically. The bracket B is of course rigidly bolted to the car body, and a comparatively strong spirally wound spring 3 is mounted upon said shaft and fixed thereto at one end while the other end is engaged with bracket B. Top cross bar 2 of the frame F has a long loop 4 at its front into which the lamp is adapted to be hooked and carried, and the spring 3 is designed to exert a normal tension to what may be called the left of the direction of travel of the car so that if the car were to stand on a straight track as in Fig. 3 and there were nothing to the contrary the said spring would turn the lamp to the left and in this instance against or away from the tension or pull of the spring 5 fixed on truck T and seen in Figs. 1, 2 and 3. Furthermore the shaft S is provided with a lateral arm *a* at its bottom and a cord, cable or chain 6 is affixed to the extremity of said arm and passes over a sheave or pulley 7 on the bottom of the car and thence connects with the said spiral spring 5.

The pull of spring 5 is directly against or opposite to the tendency or wind of spring 3 and the two springs are so related and graduated as to tension that when the car is on a straight track the lamp L will hold a directly front or forward position and continue therein until it is deflected by reason of the car taking a curve and in which the body of the car and truck respectively shift positions to right or left relatively and so on as the road may run. It has been found, however, that in order that the lamp shall always turn with the car and shed its rays along the track on a curve whether to the right or left, that there should also be a limit or stop in either direction and to this end I have provided stops in the cable 6 beyond which the said cable cannot turn or run in its turning of the lamp either way. Said cable, therefore, has two stops 8 and 9 respectively, and when a curve to the right is made the stop 8 comes into limiting position as against spring 5, while if the car turns to the left the spring 9 limits against the tension of the spring 3, but otherwise and with a normal or straight forward position of the car and road the two springs not only play one against the other and hold the lamps in a balanced or poised front position but they serve especially to absorb or neutralize any vibrations or shakings or other unfavorable movements which would make the lamp unsteady. I find that with two springs acting one against the other in this way I get an exceedingly steady light however the car may toss and turn and be shaken about in its travel and which would be impossible if the springs were not related in this way and did not perform the essential and important function of steadying the light and relieving it of vibration.

A further very important advantage of springs 5 and 3 and limiting stops 8 and 9 is to be found in the perfect setting of the lamp at the proper angle to throw the light rays on the curve at the very beginning of the turning of the car and without shift or change thereafter as the car continues to round the curve. To understand this fully reference is had to Figs. 1, 2 and 3. In Fig. 1 the light is alined straight with the straight track. As soon as the first truck T strikes the curve the light is turned to its greatest degree of angle in respect to the car, say as seen in Fig. 2. The same angle of the lamp is shown in Fig. 3, although the car is further advanced on the curve and has shifted its angular relation to the truck T. Stop 8 as hereinbefore stated limits this play of lamp L, but if it were not for spring 5, this result could not be had as the cord or chain 6 is attached to truck T and the additional sweep of the truck (from the position of the car in Fig. 2 to that of Fig. 3) would either break the connections, or if no stop 8 were used, would throw the lamp to a different angle from that most desired. Briefly, spring 5 will yield and stretch as truck T continues to turn to its maximum angle in respect to the car body after its first or initial shift upon striking the curve and after lamp L has been turned to its desired angle. Arm $a$ is short and has a series of openings —10— at its free end (see dotted lines, Fig. 6) to which cable or chain 6 is attached nearer to or at a greater distance from shaft S to not only change the arc movement of the lamp but also the rapidity of its movement as compared with the turn of the truck T. Obviously, only a short turn or change of position of the truck to the car body will throw lamp L to the limit of its movement as defined by stops 8 and 9, and this is my aim and object, and then any further turn of the truck is taken care of in cable or chain 6 by spring 5. If the turn is in the reverse direction to that shown in Figs. 2 and 3, spring 3 and stop 9 turn and limit lamp L in the same manner as in the other case, but spring 5 now simply acts to take up the slack in the cable or chain 6 between the truck and sheave or pulley 7. However, if the slack should become excessive and beyond control of spring 5, no change in effect is had at the lamp as it is under complete control at this time of spring 3 and stop 9.

What I claim is:

1. The combination with a car truck and body of a head-light adapted to turn with turns in a road, a vertically mounted shaft carrying said light and a spiral spring thereon, a spring connected with said truck and a cable connecting the same operatively with said shaft, a sheave over which said cable runs and stops in said cable to limit the rotation of said shaft.

2. A car body and a truck, a headlight on the said body and operating means for said light including two springs arranged to act oppositely to each other with the said light under the constant tension of both springs, a shaft carrying the light and one of said springs thereon and an arm rigid with said shaft, and the other of said springs operatively connected with the said truck and with the said arm.

In testimony whereof I affix my signature in presence of two witnesses.

WINFIELD S. WALTZ.

Witnesses:
F. C. MUSSUN,
E. M. FISHER.